No. 610,467. Patented Sept. 6, 1898.
W. G. BARNHARDT.
COMBINED THILL COUPLING AND BRAKE.
(Application filed Dec. 1, 1896.)
(No Model.)
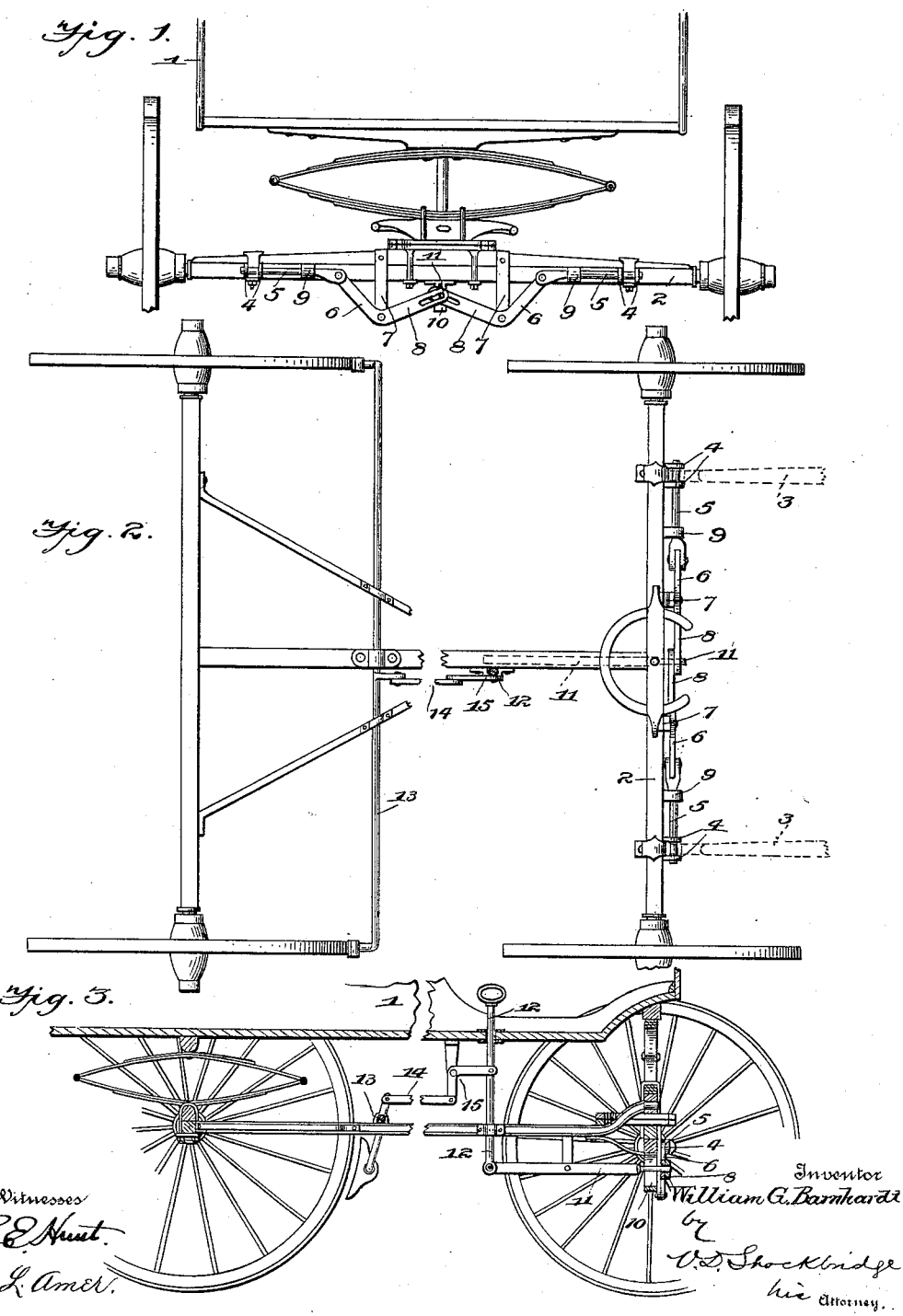

UNITED STATES PATENT OFFICE.

WILLIAM G. BARNHARDT, OF TOWER CITY, PENNSYLVANIA.

COMBINED THILL-COUPLING AND BRAKE.

SPECIFICATION forming part of Letters Patent No. 610,467, dated September 6, 1898.

Application filed December 1, 1896. Serial No. 614,079. (No model.)

*To all whom it may concern:*

Be it known that I, WILLIAM G. BARNHARDT, a citizen of the United States, residing at Tower City, in the county of Schuylkill and State of Pennsylvania, have invented certain new and useful Improvements in a Combined Thill-Coupling and Brake; and I do hereby declare the following to be a full, clear, and exact description of the invention, such as will enable others skilled in the art to which it appertains to make and use the same.

This invention has reference to a novel construction in a combined thill-coupling and brake-operating mechanism for vehicles, the object being to provide a construction whereby the thills may be uncoupled from the vehicle and a brake applied by the driver in case the horse attached to the vehicle should run away or become unmanageable.

The invention consists in the features of construction hereinafter described and specifically claimed.

In the accompanying drawings, forming a part of this specification, Figure 1 is a front elevation of a vehicle constructed in accordance with this invention. Fig. 2 is a plan view of the running-gear, partly in section. Fig. 3 is a side elevation, partly in section.

Referring now to said drawings, 1 indicates the body of a vehicle, and 2 the front axle thereof. The thills 3 are of ordinary construction and are adapted to pass between the eye-lugs 4 upon the axle 2. The coupling-pins for said thills consist of the long pins 5, whose outer ends are adapted to pass through the eye-lugs and the ends of the thills 3. To the inner ends of these pins 5 are pivoted the outer arms of bell-crank levers 6. These bell-crank levers 6 are pivoted to the front axle, conveniently to the depending brackets 7 thereof, and are provided with slotted inner arms 8. The pins 5 move longitudinally and are guided near their outer ends by means of the guides 9, attached to the axle 2. To the lower face of the axle 2 is secured a guide-loop 10, through which the forward end of the lever 11 passes, said lever being pivoted to a stationary part of the vehicle and pivotally connected at its rear end with an upright operating-arm 12, that extends up through the body of the vehicle adjacent to the driver's seat, so that it can be operated by the driver. The brake for said vehicle consists of the ordinary brake-beam 13, connected by means of a link 14 with one arm of the bell-crank lever 15, whose other end is connected with the operating-arm 12, and so arranged that as the operating-arm 12 is raised the link 14 is moved forwardly to apply the brakes.

It will be understood, of course, that the thill-coupling can be used without the brake-applying mechanism; but when these parts are combined it will be seen that if it is desired to uncouple the thills and apply the brake the driver raises the operating-arm 12, which depresses the forward end of the lever 11, and this moves the slotted ends of the bell-crank lever 6 downwardly, thereby drawing the pins 5 from the eye-lugs to release the thills. By the same movement of the operating-lever the horizontal arm of the bell-crank lever 15 is raised, which throws the vertical arm thereof forwardly and through the link 14 applies the brakes.

Having thus described my invention, what I claim as new, and desire to secure by Letters Patent, is—

1. The combination with the axle of a vehicle, of a pair of simultaneously and oppositely movable pins, bell-crank levers pivoted to the inner ends of said pins and having their adjacent ends overlapped and provided with elongated slots, a lever disposed at right angles to said bell-crank levers and having one end located within said slots, and an operating-arm for said lever.

2. The combination with the axle of a vehicle, of a pair of simultaneously and oppositely movable pins, a pair of bell-crank levers pivoted to the inner ends of said pins and having their adjacent ends overlapped and provided with elongated slots, an operating-lever disposed at right angles to said bell-crank levers and having one end located within said slots, an operating-arm connected with said operating-lever, a movable brake-beam, and connections between said brake-beam and said operating-lever, as and for the purpose set forth.

3. In a device of the character set forth, the combination with releasing mechanism for the thills, comprising simultaneously and oppositely movable pins, and a pair of bell-crank levers pivoted respectively to the inner ends of said pins and having their adjacent ends crossed and provided with elongated slots, of an operating-lever disposed at right angles to said bell-crank levers and having one end located within said elongated slots, an operating-arm pivoted to the operating-lever, a bell-crank lever pivoted at one end to said operating-arm, a brake-beam carrying a brake, and connections between said beam and the other arm of said bell-crank lever, as and for the purpose set forth.

In testimony whereof I have signed this specification in the presence of two subscribing witnesses.

WILLIAM G. BARNHARDT.

Witnesses:
  WILLIAM T. KOLVA,
  HENRY J. KOLVA.